July 11, 1961 S. O. JOHNSON 2,991,982
CENTRIFUGAL FLUID MOVING DEVICE
Filed Sept. 12, 1957 3 Sheets-Sheet 1
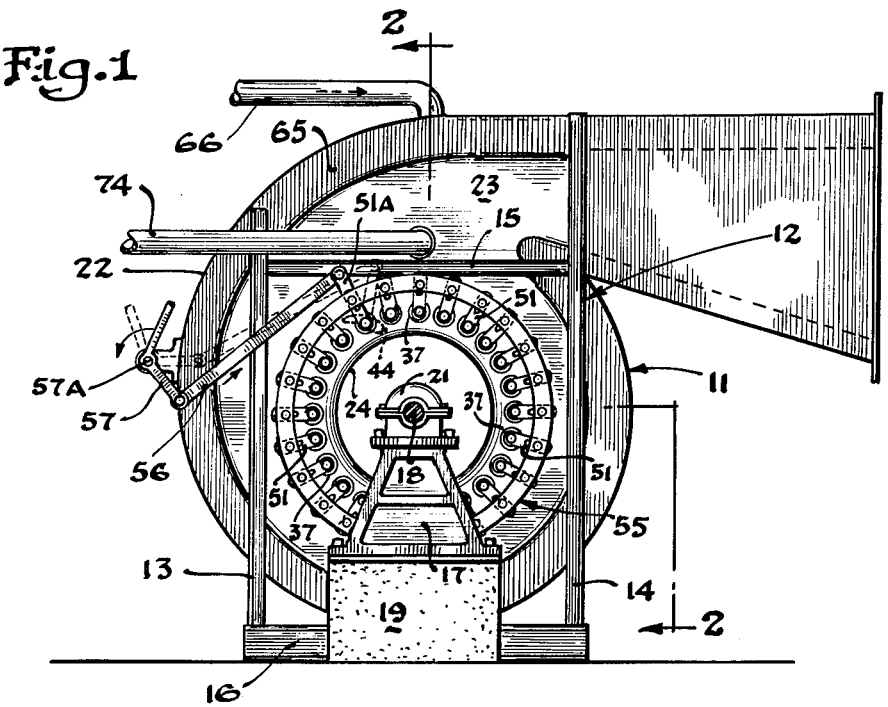
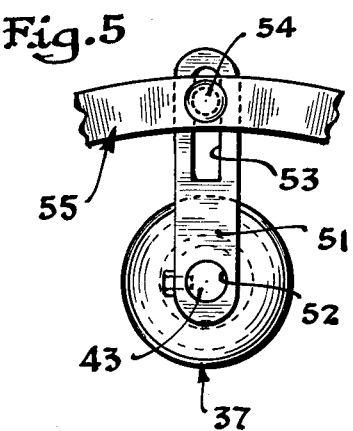
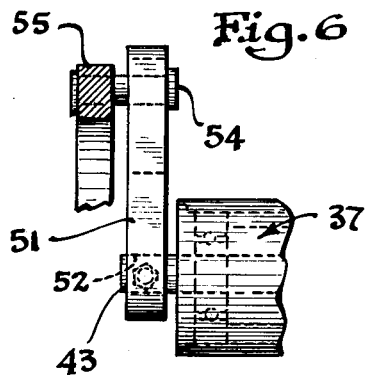
Inventor
Sigurd O. Johnson
By Anthony S. Zummer
Attorney

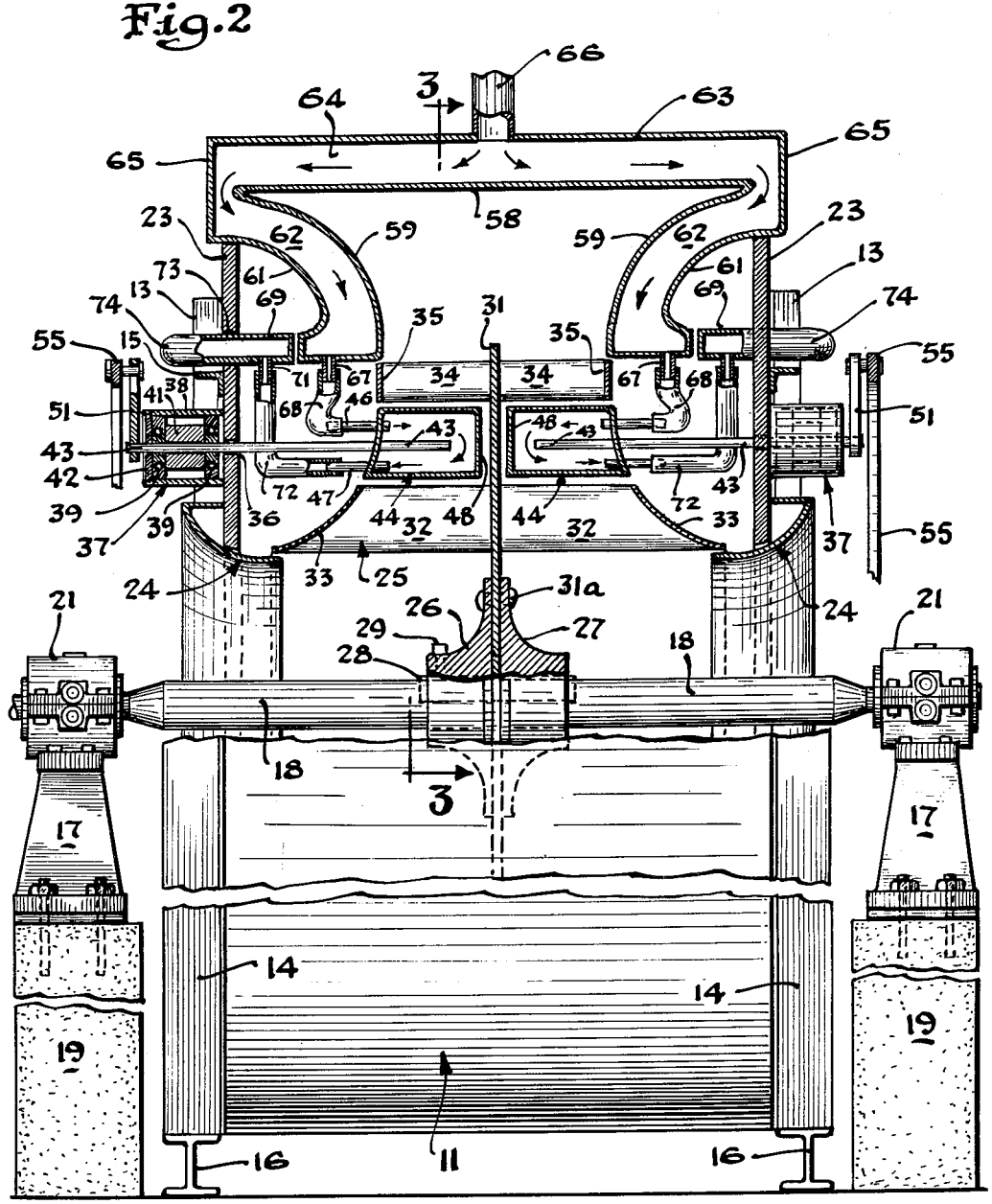

July 11, 1961  S. O. JOHNSON  2,991,982
CENTRIFUGAL FLUID MOVING DEVICE
Filed Sept. 12, 1957  3 Sheets-Sheet 3
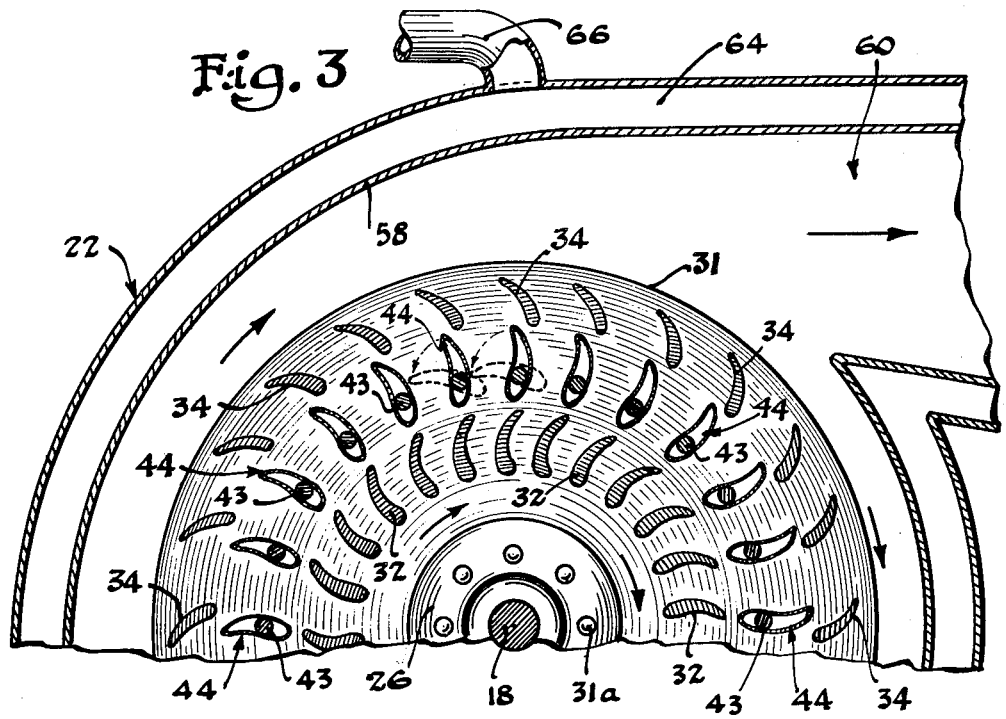
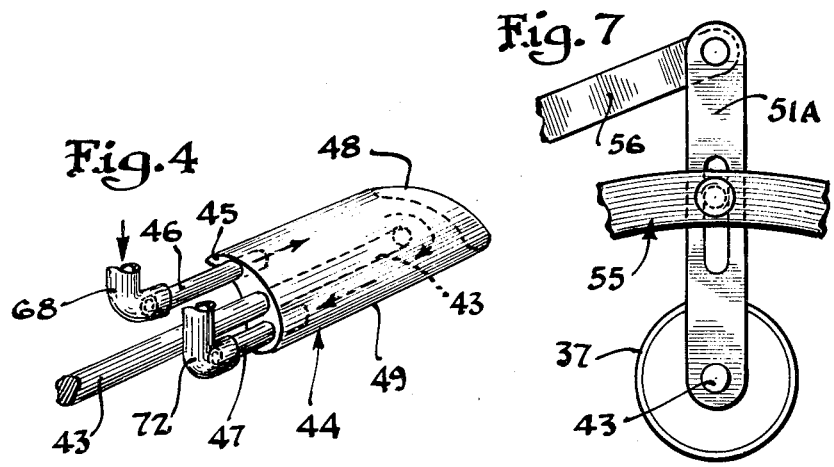
Inventor
Sigurd O. Johnson
By Anthony S. Zummer
Attorney United States Patent Office 2,991,982
Patented July 11, 1961

2,991,982
CENTRIFUGAL FLUID MOVING DEVICE
Sigurd O. Johnson, 901 S. Crecent, Park Ridge, Ill.
Filed Sept. 12, 1957, Ser. No. 683,528
5 Claims. (Cl. 257—260)

This invention relates to radial flow type centrifugal fluid moving devices.

In the power generation industry, the efficiency of fans or blowers having a capacity from 1,000 to 300,000 cubic feet per minute is quite important, because these fans require as much as 4,000 horsepower to operate. A reduction in fan efficiency increases the amount of power consumed and renders the overall plant efficiency low.

It is well known, that a fan may be designed for an optimum efficiency at a given output and at a given speed. It is also well known, that the output of the fan may vary with the speed, but it is also known that a given construction operates most efficiently at one speed, therefore, it is desirable to operate the fan at its designed speed.

In a usual fan or blower application, it is often necessary to vary the output of the fan with conditions existing in some other pieces of equipment, for instance, a furnace. There are two common methods of varying the output of the fan; one is to slow down the fan which is expensive since a variation of the speed of the fan requires either a variable speed motor, or a variable speed coupling in conjunction with a constant speed motor. Another method is to vary the input of the fan by adjusting variable inlet vanes. The presence of the inlet vanes at the maximum output of the fan acts as an obstruction to the free flow of air into the fan, thus, decreasing the efficiency of the operation of the fan.

In the same type of operation mentioned above, it is often necessary to heat the air supplied by the fan. Heated air is desirable for a number of reasons, one of which is to protect a main air preheater from condensation and corrosion by keeping the surface temperature above the air dewpoint temperature. The air is usually heated after it has been pumped through the fan so that the fan need carry a smaller volume of air. In many of the present applications, a heater is placed outside the fan in the flow path so that the heater also acts as an obstruction to the free flow of air from the fan. This situation decreases the efficiency of the plant by increasing the back pressure.

One of the objects of the instant invention, is to provide a means for varying the capacity of a fluid moving device at a constant speed without a sacrifice of the efficiency at the maximum output.

Another object of the instant invention is to provide a means for thermally effecting a fluid pumped by a fan without obstructing the free flow of the fluid.

A further object of the invention herein disclosed, is to provide a fluid moving device which contains integral therewith, means for varying the capacity of the device without a sacrifice of the efficiency at the maximum output and means for thermally effecting the fluid being moved.

Other objects, uses, and advantages will be obvious or become apparent from a consideration of the following description and the accompanying drawings.

In the drawings:

FIGURE 1 is a side view of a radial type centrifugal fan;

FIGURE 2 is a partial cross-sectional view taken on line 2—2 as shown in FIGURE 1;

FIGURE 3 is a cross-sectional view of a portion of the fan taken on line 3—3 in FIGURE 2;

FIGURE 4 is a perspective view of a hollow vane;

FIGURE 5 is an enlargement of a portion of the connection mechanism between a vane shaft and an angle adjustment;

FIGURE 6 is an end view of the mechanism shown in FIGURE 5; and

FIGURE 7 is a side view of a control shaft arm and a portion of the control linkage.

Referring now to FIGURE 1, a two-stage radial flow centrifugal fan is generally indicated by numeral 11. The fan 11 is supported by a frame, generally indicated by numeral 12. The frame 12 consists of upright supports 13 and 14 joined by a horizontal support 15 and rests on I-beams 16. A pedestal, generally indicated by numeral 17 has a vertical support 19, and a bearing box 21 supporting a drive shaft 18 connected to a suitable source of power which is not shown. A casing 22 is attached to the frame 12 by means of welds, but any means of mechanical attachment is acceptable, such as nuts and bolts or rivets. A side wall 23 of the casing 22 contains an air inlet opening 24 through which extends the shaft 18.

Looking now to the cross section of an upper portion of the fan shown in FIGURE 2, a rotor 25 has a central hub consisting of two parts 26 and 27 mounted on the shaft 18 by means of a key 28 and set screw 29. A common center plate 31 is attached to the central hub by means of rivets 31a. Attached to the center plate 31 is a first stage of the rotor 25 consisting of forwardly curved airfoil blades 32 which may be single thickness blades. The blades 32 in this instance are welded onto the center plate 31, but any suitable means of attaching the blades 32 to the center plate 31 is acceptable. Along the outer edge of blades 32, is a side shroud 33 which is welded to the blades in this instance, but the shroud may be attached by any suitable means.

Spaced from the blades 32 is a second stage of the rotor 25 consisting of blades 34; in this instance the blades are backwardly curved airfoil blades but may be single thickness blades. Blades 34 are attached to the center plate by welds and side shrouds 35 are also fixed to the blades 34 by appropriate welds.

The side walls 23 have a plurality of vane shaft apertures 36 spaced about the inlet opening 24. A vane shaft support box 37 is mounted on the outside of side wall 23 adjacent each of the holes 36. Each box 37 comprises a bearing cylinder 38 with two roller bearings 39 contained therein, and a spacer 41 between the bearings, and a box cover plate 42 retains the bearings within the cylinder. Mounted within bearings 39 is a vane shaft 43 so that the shaft 43 may rotate freely within the box.

As may be seen in FIGURE 4, an airfoil vane 44 is fixed to the vane shaft 43. The vanes 44 consist of a formed end 45 fixed on shaft 43, and an inlet pipe 46 and an outlet pipe 47 fixed therein. The vane 44 has a closed end 48, as is seen in FIGURE 2. A piece of sheet metal 49 is welded to the two ends to form the outer surface of the vane 44. The end of shaft 43 extending into vane 44 touches the sheet metal 49 to prevent an easy flow of water between the shaft and the sheet metal 49, thus, the shaft end acts as an effective divider for the vane.

A plurality of vanes 44 are positioned between blades 32 and 34 which make up the first and second stages of rotor 25 to form a variable diffuser which acts as a heater and volume control device between the two stages.

Attached to the opposite end of shaft 43 is a vane angle adjustment means having a shaft arm 51 through which extends a hole 52 with shaft 43 fixed therein. The shaft arm 51 also contains a slot 53 proximate one end, which receives an angle adjustment pin 54 that is fixed in an angle adjustment ring 55. A control shaft arm 51A is pivotally connected to one end of link 56 and the other end of said link is pivotally connected to a control arm 57 which is fixed to control shaft 57A that is rotatably mounted on casing 22, seen in FIGURE 1, which connects the angle adjustment rings 55 on the opposite sides of the fan 11 to complete the vane angle adjustment means.

The casing 22 has an inner scroll casing 58 extending to a diverging opening 60 and a stationary diffuser 59 is attached to the scroll 58. Outside the stationary diffuser is a diffuser wall 61 which forms a heat transfer fluid chamber 62 between the diffuser wall 61 and the stationary diffuser 59. Another chamber wall 63 is spaced from scroll 58 to form a scroll heat transfer fluid chamber 64 between the outside wall 63 and the scroll 58. An end wall 65 connects diffuser wall 61 and outside wall 63 to form a passage from the chamber 64 to chamber 62.

A pipe 66 connected to a hot water source opens into chamber 64 as is seen in FIGURES 1 and 2. Connected to chamber 62 is a plurality of outlets 67 which are connected to inlets 46 of vanes 44 by means of flexible pipes 68.

Attached to side walls 23 are collector rings 69 having a plurality of inlets 71. The inlets 71 are connected to outlets 47 of vanes 44 by means of flexible pipes 72. The collector rings 69 each have an opening 73 through side walls 23 connecting them to drain pipe 74 which returns the fluid to the fluid source.

*Operation*

The rotor 25 rotates on shaft 18 which is driven by a suitable source of energy, and blades 32 pick up air entering through openings 24 and force it radially outward against vanes 44. Vanes 44 direct the air to the second stage of the rotor and blades 34 radially force the air out through the stationary diffuser 59 along scroll 58 and out through the diverging opening 60.

The angle of the vanes 44 which make up the variable diffuser between the two stages of the rotor, control the amount of air flow through the fan and the angle may be changed simply by rotating control shaft 57A which in turn rotates control arm 57. The rotation of control arm 57 moves arm 51A through link 56 and the rotation of arm 51A rotates ring 55 which in turn pivots arms 51 and determines the rotation of shafts 43. As the shafts 43 rotate, so do the vanes 44. Thus, the vanes 44 have their angle changed. As the opening between the vanes 44 is decreased, the amount of fluid flow is decreased. Thus, it is possible to effectively cut off the fluid flow through the fan by closing the spaces between the vanes 44. This may be done while the rotor is turning at its optimum speed, but when the vanes are open to their full position, the same speed of rotation produces the maximum output of the fan without any loss in efficiency since the diffuser vanes 44 aid in the flow of fluid through the fan, rather than acting as an obstruction as in the prior arrangements.

As the air is pumped by the fan, it may also be heated at the same time at the vanes 44, the scroll 58 and the stationary diffuser 59.

Water is carried from a hot water source through pipe 66 to chamber 64. From chamber 64 the hot water goes into annular chambers 62 and flows to the interior of vanes 44, through outlet 67, flexible pipe 68, and inlet 46. The water travels through vanes 44 in the direction of the arrows shown in FIGURE 2, then out through outlet 47 to pipe 72 and to collector ring 69. From the collector rings 69 it goes to pipes 74 and back to the source.

It should be noted that the particular arrangement of the vanes 44 forces the water to travel a complete path through the hollow portion of the vanes. Thus, the entire vane is heated since the end of shaft 43 acts as a divider for the hollow portion of the vane.

The hot water flow through the vanes may continue while the vanes angularly change to vary the amount of air pumped by the fan because the flexibility of pipes 68 and 72 allow the vanes 44 to change their angular position without detaching the pipes.

As the air leaves the first stage blades 32, it then strikes vanes 44 of the variable diffuser. These vanes 44 not only act as a diffuser, but also contain a heating element therein to heat the air entering therebetween. It may be noted, that the heating of the air at this point is done by an element which does not decrease the efficiency of the fan but rather is an integral portion of the fan so that there is no obstruction hindering the free flow of air pumped therebetween.

After the air leaves the variable diffuser, it flows into the second stage of the rotor and blades 34 force the air out through the stationary diffuser 59. The air contacting the side walls of stationary diffuser 59 is also heated since hot water flowing through chamber 62 heats the diffuser 59. In effect, there is a heating element coacting with the stationary diffuser 59. Upon leaving diffuser 59, the air contacts scroll 58 and the air is further heated since the scroll is in a thermal conductive relation to chamber 64, which contains hot water. Thereafter, the air discharges through opening 60.

In this particular arrangement, the air and the heat transfer fluid, that is, the hot water, are in a counterflow relation which means that the water at the highest temperature heats the air at the highest temperature, and the water at the lowest temperature heats the air at the lowest temperature. This particular arrangement provides for a more efficient operation of the heating of the air.

The heating of the air pumped by the fan within the fan, allows the air to be heated without the need for heaters in the flow path of the air after it leaves the fan. Thus, the back pressure is reduced and the overall efficiency of the fan is increased. Furthermore, this construction renders the unit much more compact by making the heat exchanger integral with the fan.

Should it be desirable to cool the air pumped by the fan, cold water may be used through the chambers 64 and 62 and through the vanes 44 which would thus cool the air. Furthermore, it would be possible to use some fluid other than water as the heat transfer fluid if it would be so desired. This particular fan is in no way limited to the application of pumping air. Any other type of fluid may be pumped by this fan, but air has been used in this instance as a convenient illustration.

Although a double width, double inlet fan or blower was described, it is obvious that the instant invention may be used with a single width fan or blower having a single inlet. The invention herein described, may be used in conjunction with a fan or blower having inlet boxes as well as those not having inlet boxes as the one described above.

The foregoing description and the drawings are given merely to explain and illustrate my invention, and the invention is not to be limited thereto, except insofar as the appended claims are so limited since those skilled in the art who have my disclosure before them will be able to make modifications and variations therein without departing from the scope of the invention.

I claim:

1. A centrifugal fluid moving device for moving air and controlling the temperature of the air moved by said device comprising, in combination, a scroll having an air inlet in the center of the scroll and an air outlet on the periphery of the scroll, a fluid chamber associated with and surrounding said scroll for holding a heat transfer fluid adjacent to and in thermal relationship with the scroll to effect a temperature change in air passing through the scroll, a rotor rotatably mounted within the scroll having its axis of rotation extending through the air inlet for forcing air from said air inlet out of the air outlet at an increased pressure, a diffuser mounted within said scroll cooperative with the rotor and surrounding at least a stage of the rotor, said diffuser including a plurality of pivotally mounted hollow vanes, each of said vanes having an air foil cross section and having its axis of pivoting substantially parallel to the axis of the vane and substantially parallel to the axis of rotation of the rotor, each of said vanes having an inlet and an outlet on one end and a divider between said inlet and outlet, each of said dividers extending along a major portion of the length of its respective vane to provide a flow path for a heat transfer fluid proximate to the entire outer surface of the vane, means providing a source of heat transfer fluid, means connecting the inlet of each of said vanes with the means providing a source of heat transfer fluid, and means for pivotedly positioning all of the vanes in unison for regulating the flow of air out of the air outlet, whereby air is drawn into the scroll through the air inlet, the rotor forces the air outward from it through the diffuser, air passing through the diffuser has its temperature regulated by a heat transfer fluid within each of said diffuser vanes and the heat transfer fluid in the fluid chamber associated with the scroll, and the position of the vanes regulates flow of air from the outlet.

2. A centrifugal fluid moving device comprising, in combination, a scroll having an air inlet in the center of the scroll and an air outlet on the periphery of the scroll, a rotor rotatably mounted within said scroll having its axis of rotation extending through the air inlet for forcing air from said air inlet out of the air outlet at an increased pressure, a diffuser mounted within said scroll cooperative with the rotor and surrounding at least a stage of the rotor, said diffuser including a plurality of angularly adjustable hollow vanes, each of said vanes having an air foil cross section and having its axis of angular adjustment substantially parallel to the axis of the respective vane and substantially parallel to the axis of rotation of the rotor, each of said vanes having an inlet and an outlet on one end and a divider between said inlet and said outlet, each of said dividers extending along a major portion of the length of its respective vane to provide a flow path for a heat transfer fluid proximate to the entire outer surface of the vane, means providing a source of heat transfer fluid, means connecting the inlet of each of said vanes with the means providing a source of heat transfer fluid, and means for angularly positioning all of the vanes in unison for regulating the flow of air out of the air outlet, whereby air is drawn into the scroll through the air inlet, the rotor forces the air outward from it through the diffuser, the air passing through the diffuser has its temperature regulated by a heat transfer fluid within the diffuser vanes, and the angular position of the vanes regulates the flow of air from the air outlet.

3. A centrifugal fluid moving device for moving air and controlling the temperature of the moved air comprising, in combination, a scroll having an air inlet in the center of the scroll and an air outlet on the periphery of the scroll, a rotor rotatably mounted within said scroll having its axis of rotation extending through the air inlet for forcing air from said air inlet out of the air outlet at an increased pressure, a diffuser mounted within said scroll cooperative with the rotor and surrounding at least a stage of the rotor, said diffuser including a plurality of pivotedly mounted hollow vanes, each of said vanes having an air foil cross section and having its axis of pivoting substantially parallel to the axis of the respective vane and substantially parallel to the axis of rotation of the rotor, each of said vanes having a thin wall outer surface and having an inlet and an outlet on one end, each of said vanes having a divider effectively dividing the vane into two halves over a major portion of the length of the vane and said divider being positioned between the inlet and the outlet to provide a flow path for a heat transfer fluid proximate to the entire outer surface of the vane, means providing a source of heat transfer fluid, means connecting the inlet of each of said vanes with the means providing a source of heat transfer fluid, and means for pivotedly positioning all of the vanes in unison for regulating the flow of air out of the air outlet, whereby air is drawn into the scroll through the air inlet, the rotor forces the air outward from it through the diffuser, the air passing through the diffuser has its temperature regulated by a heat transfer fluid within the diffuser vanes through the thin wall outer surface of the vanes, and the position of the vanes regulates the flow of air from the air outlet.

4. A centrifugal fluid moving device for moving air under pressure and regulating the temperature of the moved air comprising, in combination, a scroll having an air inlet in the center of the scroll and an air outlet on the outer periphery of the scroll, a rotor rotatably mounted in said scroll having its axis of rotation extending through the air inlet for forcing air from said air inlet out of the air outlet at an increased pressure, a diffuser mounted within said scroll cooperative with the rotor and surrounding at least a stage of the rotor, said diffuser including a plurality of pivotedly mounted hollow vanes, each of said vanes having an air foil cross section and having its axis of pivoting substantially parallel to the axis of the respective vane and substantially parallel to the axis of rotation of the rotor, each of said vanes having an inlet and an outlet on one end and a rod extending into said vane providing the vane with a divider extending along a major portion of the length of its respective vane to provide a flow path for a heat transfer fluid proximate to the entire outer surface of the vane, each of said rods protruding from its respective vane out of the scroll, means providing a source of heat transfer fluid, means connecting the inlet of each of said vanes with the means providing a source of heat transfer fluid, and means cooperative with said rods for pivotedly positioning all of the vanes in unison for regulating the flow of air out of the air outlet, whereby air is drawn into the scroll through the air inlet, the rotor forces the air outward from it through the diffuser, the air passing through the diffuser has its temperature regulated by a heat transfer fluid within the diffuser vanes, and the position of the vanes regulates the flow of air from the outlet.

5. A centrifugal fluid moving device for delivering air under pressure at a regulated temperature and volume comprising, in combination, a scroll having an air inlet at the axial center of the scroll and an air outlet on the outer periphery of the scroll, a fluid chamber associated with said scroll for holding a heat transfer fluid adjacent to and surrounding the scroll to effect a temperature change in the air within the scroll, a rotor rotatably mounted in said scroll having its axis of rotation extending through the air inlet for forcing air from said air inlet out of the air outlet at an increased pressure, a diffuser mounted within said scroll cooperative with the rotor and surrounding at least a stage of the rotor, said diffuser including a plurality of pivotedly mounted hollow vanes, each of said vanes having an air foil cross section and having its axis of pivoting substantially parallel to the axis of the respective vane and substantially parallel to the axis of rotation of the rotor, each of said vanes having a thin wall outer wall forming its outer surface for contact with the air driven by the rotor, each of said vanes having an inlet and an outlet on one end and a rod mounted in said end, each of said rods being positioned between the inlet and the outlet of its respective vane and in contact with opposite sides of the inner surface of the vane to provide a divider for the interior of the vane, each of said rods extending along a major portion of the interior length of its respective vane to provide a flow path for a heat transfer fluid proximate to the entire inner surface of the vane and said rods protruding from the vanes outside of the scroll, means providing a source of heat transfer fluid, means connecting the inlet of each of said vanes with the means providing a source of heat transfer fluid, and means cooperative with said rods for pivotedly positioning all of the vanes in unison for regulating the flow of air out of the air outlet, whereby air is drawn into the scroll through the air inlet, the rotor forces the air outward from it through the diffuser, the air passing through the diffuser has its temperature regulated by a heat transfer fluid within the diffuser vanes and the heat transfer fluid in the fluid chamber associated with the scroll, and the position of the vanes regulates the volume of flow of air out of the air outlet in the scroll.

References Cited in the file of this patent

UNITED STATES PATENTS

| | | |
|---|---|---|
| 2,350,839 | Szydlowski | June 6, 1944 |
| 2,441,427 | Lincoln | May 11, 1948 |
| 2,474,410 | Aue | June 28, 1949 |
| 2,615,616 | Bowen | Oct. 28, 1952 |
| 2,671,604 | Hagen | Mar. 9, 1954 |
| 2,689,680 | Lovesey | Sept. 21, 1954 |
| 2,746,434 | Swenson | May 22, 1956 |

FOREIGN PATENTS

| | | |
|---|---|---|
| 552,391 | Great Britain | Apr. 6, 1943 |